US 7,797,436 B2

(12) United States Patent
Banerjee et al.

(10) Patent No.: US 7,797,436 B2
(45) Date of Patent: Sep. 14, 2010

(54) NETWORK INTRUSION PREVENTION BY DISABLING A NETWORK INTERFACE

(75) Inventors: Pradipta Kumar Banerjee, Bangalore (IN); Ananth Narayan Mavinakayanahalli Gururaja, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/875,945

(22) Filed: Oct. 21, 2007

(65) Prior Publication Data

US 2008/0046563 A1 Feb. 21, 2008

Related U.S. Application Data

(62) Division of application No. 10/698,197, filed on Oct. 31, 2003, now Pat. No. 7,725,936.

(51) Int. Cl.
*G06F 15/16* (2006.01)

(52) U.S. Cl. ............... 709/229; 709/220; 709/225; 726/23

(58) Field of Classification Search ......... 709/223–225, 709/251, 220, 229, 250; 713/300, 320, 323, 713/324; 726/2, 23, 27, 34
See application file for complete search history.

(56) References Cited

U.S. PATENT DOCUMENTS

| 5,708,820 A * | 1/1998 | Park et al. ............... 713/323 |
| 6,408,391 B1 * | 6/2002 | Huff et al. ............... 726/22 |
| 6,732,190 B1 * | 5/2004 | Williams et al. ........... 709/250 |
| 7,194,642 B2 * | 3/2007 | Pontarelli .................. 713/320 |
| 7,269,752 B2 * | 9/2007 | John ........................... 713/324 |
| 7,436,770 B2 * | 10/2008 | Sterne et al. .................. 726/23 |
| 7,441,272 B2 * | 10/2008 | Durham et al. ............... 726/23 |
| 7,511,861 B2 * | 3/2009 | Hulan et al. ................. 358/404 |
| 2006/0143709 A1 * | 6/2006 | Brooks et al. ................ 726/23 |
| 2007/0094741 A1 * | 4/2007 | Lynn et al. ................... 726/26 |

FOREIGN PATENT DOCUMENTS

JP    PUPA 2002-111727    12/2002

OTHER PUBLICATIONS

Miyake, Yasuo, "Perfect Manual for Worm Measures-Construction of Firewall," Unix User, Apr. 2002, Softbank Publishing Company, vol. 11, No. 4, pp. 45-50.
Katzuno, H, "Basics of Security for New Managers (for Practical Application) 3rd Edition: The Right Usage of Intrusion Detection System (IDS)," Nikkei Open System, Nikkei BP, Nov. 26, 2002, No. 116, pp. 170-177.

* cited by examiner

*Primary Examiner*—Ramy M Osman
(74) *Attorney, Agent, or Firm*—Anthony V S England; William A. Steinberg (57) ABSTRACT

Methods, systems, and computer-readable mediums containing programmed instructions are disclosed for detecting an intrusion in a communications network. Data packets processed by a transport layer of a network protocol associated with the communications network are scanned using signatures from a repository of the signatures. A determination is made if the scanned data packets are malicious. One or more actions are taken if any data packets are determined to be malicious. Methods, systems, and computer-readable mediums containing programmed instructions are also disclosed for preventing an intrusion in a communications network.

18 Claims, 8 Drawing Sheets

NETWORK INTRUSION PREVENTION BY DISABLING A NETWORK INTERFACE

CROSS REFERENCE TO RELATED APPLICATION

This is a continuation of, and hereby claims the benefit of the priority date of, application Ser. No. 10/698,197 of Oct. 31, 2003 now U.S. Pat. No. 7,725,936.

FIELD OF THE INVENTION

The present invention relates generally to the field of communications network security and in particular to computer software for detecting intrusions and security violations in a communications network.

BACKGROUND

Communications network security generally and computer network security in particular are frequently the objects of sophisticated attacks by unauthorised intruders, including hackers. Intruders to such networks are increasingly skilled at exploiting network weaknesses to gain access and unauthorized privileges, making it difficult to detect and trace such attacks. Moreover, security threats such as viruses and worms do not need human supervision and are capable of replicating and travelling to other networked systems. Such intrusions can damage computer systems and adversely affect vital interests of entities associated with the affected network.

Existing Network Intrusion Detection Systems (NIDS) are unsuitable for deployment on every host in a network due to problems that are inherent in the architecture of such NIDS. NIDS use promiscuous mode capture and analysis, which induces significant overhead on the system and are vulnerable to insertion and evasion attacks.

Ptacek, Thomas H., and Newsham, Timothy N., "Insertion, Evasion and Denial of Service: Eluding Network Intrusion Detection", (http://secinf.net/info/ids/idspaper/idspaper.html), describe further details, including network intrusion detection.

SUMMARY

In accordance with one aspect of the invention, there is provided a method of detecting an intrusion in a communications network. The method comprises the steps of: scanning data packets processed by a transport layer of a network protocol associated with the communications network using signatures from a repository of the signatures; determining if the scanned data packets are malicious; and taking at least one action if any data packets are determined to be malicious.

The actions may comprise at least one of interrupting transmission of any data packets determined to be malicious to the application layer of the network protocol, comprises logging of errors related to any data packets determined to be malicious, modifying firewall rules of a host computer if any data packets are determined to be malicious, informing a network administrator any data packets are determined to be malicious, intimating the transport layer terminate an existing connection related to any data packets determined to be malicious, blocking network access to a source of any data packets determined to be malicious, terminating an application of an application layer if any data packets are determined to be malicious, and notifying an application of an application layer if any data packets are determined to be malicious.

The method may further comprise the step of transmitting to the application layer any data packets determined not to be malicious.

The method may further comprise the step of processing data packets from the transport layer.

The method may further comprise the step of determining if the protocol is monitored.

The scanning and determining steps may be implemented using a scan module.

At least one application receive queue (ARQ) may function intermediate the transport layer and the application layer. The scanning step may be carried out between the transport layer and the at least one application receive queue (ARQ).

The method may further comprise the step of obtaining data from at least one application receive queue (ARQ). The at least one application receive queue may function directly intermediate the transport layer and the application layer. The scanning step may be performed on data packets in the at least one application receive queue (ARQ).

The method may further comprise the step of dispatching the data packets to one or more handlers for scanning, if the protocol is monitored.

The scanning and determining steps may be implemented using a scan daemon.

The method may further comprise the step of generating fake responses.

In accordance with another aspect of the invention, there is provided a method of preventing an intrusion in a communications network. The method comprises the steps of: disabling a network interface of a host if an idle time expires; determining if any packets are to be transmitted; and enabling the network interface if at least one packet is determined to be available to be transmitted.

In accordance with further aspects of the invention, a system for detecting an intrusion in a communications network and a computer-readable medium containing programmed instructions arranged to detect an intrusion in a communications network are disclosed, implementing the above method of detecting.

In accordance with still further aspects of the invention, a system for preventing an intrusion in a communications network and a computer-readable medium containing programmed instructions arranged to prevent an intrusion in a communications network are disclosed, implementing the above method of preventing.

BRIEF DESCRIPTION OF THE DRAWINGS

A small number of embodiments of the invention are described hereinafter with reference to the drawings, in which.

DETAILED DESCRIPTION

Methods, systems, and computer program products are disclosed for detecting an intrusion in a communications network. Also, methods, systems, and computer program products are disclosed for preventing an intrusion in a communications network. In the following description, numerous specific details, including network configurations, network protocols, programming languages, and the like are set forth. However, from this disclosure, it will be apparent to those skilled in the art that modifications and/or substitutions may be made without departing from the scope and spirit of the invention. In other circumstances, specific details may be omitted so as not to obscure the invention.

The methods for detecting an intrusion in a communications network may be implemented in modules. Likewise, the methods for preventing an intrusion in a communications network may be implemented in software. A module, and in particular its functionality, can be implemented in either hardware or software. In the software sense, a module is a process, program, or portion thereof, that usually performs a particular function or related functions. Such software may be implemented in Java, C, C++, Fortran, for example, but may be implemented in any of a number of other programming languages/systems, or combinations thereof. In the hardware sense, a module is a functional hardware unit designed for use with other components or modules. For example, a module may be implemented using discrete electronic components, or it can form a portion of an entire electronic circuit such as an Field Programmable Gate Arrays (FPGA), Application Specific Integrated Circuit (ASIC), and the like. A physical implementation may also comprise configuration data for a FPGA, or a layout for an ASIC, for example. Still further, the description of a physical implementation may be in EDIF netlisting language, structural VHDL, structural Verilog or the like. Numerous other possibilities exist. Those skilled in the art will appreciate that the system can also be implemented as a combination of hardware and software modules.

Deploying a Network Intrusion Detection System (NIDS) on every host in a network substantially increases the security of the entire network. The embodiments of the invention disclose architectures that differ from existing NIDS architecture in that HNIDS architecture does not work on passive protocol analysis using promiscuous mode capture, thereby facilitating the use of NIDS on every host in the network. The embodiments presented hereinafter are not intended to be, or considered to be, a complete list of possible embodiments of the invention.

Overview

The embodiments of the invention disclose a "Host-based Network Intrusion Detection System" (HNIDS) that allows each host in a network to run network intrusion detection software, in a manner analogous to anti-virus software. The architecture enables every system on the network to act as an autonomous entity in detecting and managing intrusions.

Every system that is able to communicate over a network must use a communication protocol (e.g., the TCP/IP protocol is commonly and widely used). The Network Layer (IP in the case of the TCP/IP protocol) handles fragmentation, and the Transport Layer (TCP and UDP in the case of the TCP/IP protocol) of the communication protocol take care of reordering and reassembling packets, as necessary. Once this processing is complete, data is submitted to the application layer.

HNIDS leverages the behaviour of the protocol stack and scans data for malicious content, after the network and transport layers have completed processing the data. Thus, HNIDS works on the data in its entirety, thereby mitigating the problems of insertion and evasion attacks as well as latency and overhead that are associated with existing NIDS. HNIDS scans only the data that is destined for the system on which HNIDS is used and does not use passive protocol analysis and promiscuous mode capture.

To further explain the specifics of this architecture, two different embodiments of HNIDS are set forth. In one embodiment, HNIDS scans the data before the data is submitted to the application by the transport layer. Logically, HNIDS sits between the transport and the application layers of the communication protocol (e.g., TCP/IP). In another embodiment, HNIDS monitors the application receive queue (ARQ) for incoming data and scans the data for malicious content, as and when the data arrives.

HNIDS comprises a feature for proactively preventing intrusions, thereby acting as an "Intrusion Prevention System". This is achieved by introducing the concept of "idle time", whereby the network interface is disabled after the expiration of the idle time. Idle time is the time duration during which no packet is transmitted from the system. Since the interface is disabled, the system does not process any packets from the network. Effectively, this is the same as unplugging the system from the network, preventing intrusion related activities during the off-hours when no one is using the system (e.g., at night). The network interface is enabled again when there is a packet to be transmitted to the network, which indicates that the user is present and performing some network related activity. The resulting system with the "idle-time" feature can also be termed as "Host-based Network Intrusion Detection and Prevention System".

Recently, the use of fake services (so as to lure the attackers into a trap) is gaining importance. HNIDS may also comprise provisions for setting up fake services. The embodiments of the invention involve HNIDS architectures that address problems associated with promiscuous mode capture and passive protocol analysis.

The architectures provide:
1) Prevention from "insertion" and "evasion" attacks;
2) Per packet analyses, and response on detection of malicious content;
3) Facilitation for usage of deception mechanisms to determine the intent of the user; and
4) Improvements to overall security of the network.

General Concept

Figure 1:
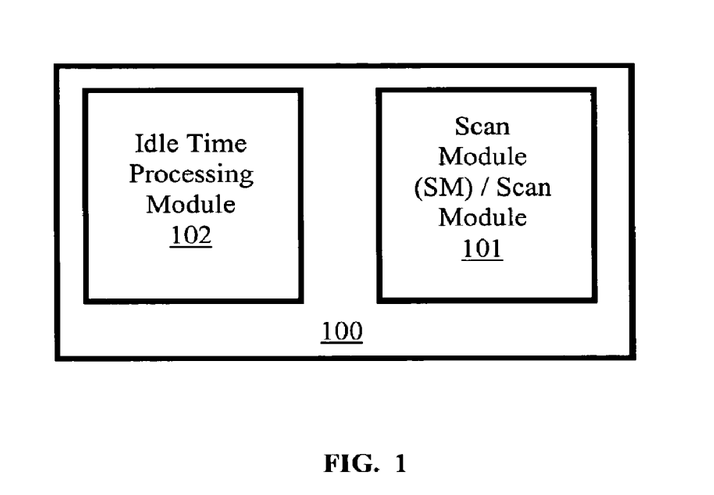
FIG. 1 is a functional block diagram of Host-Based Network Intrusion Detection Systems (HNIDS)
Figure 9:
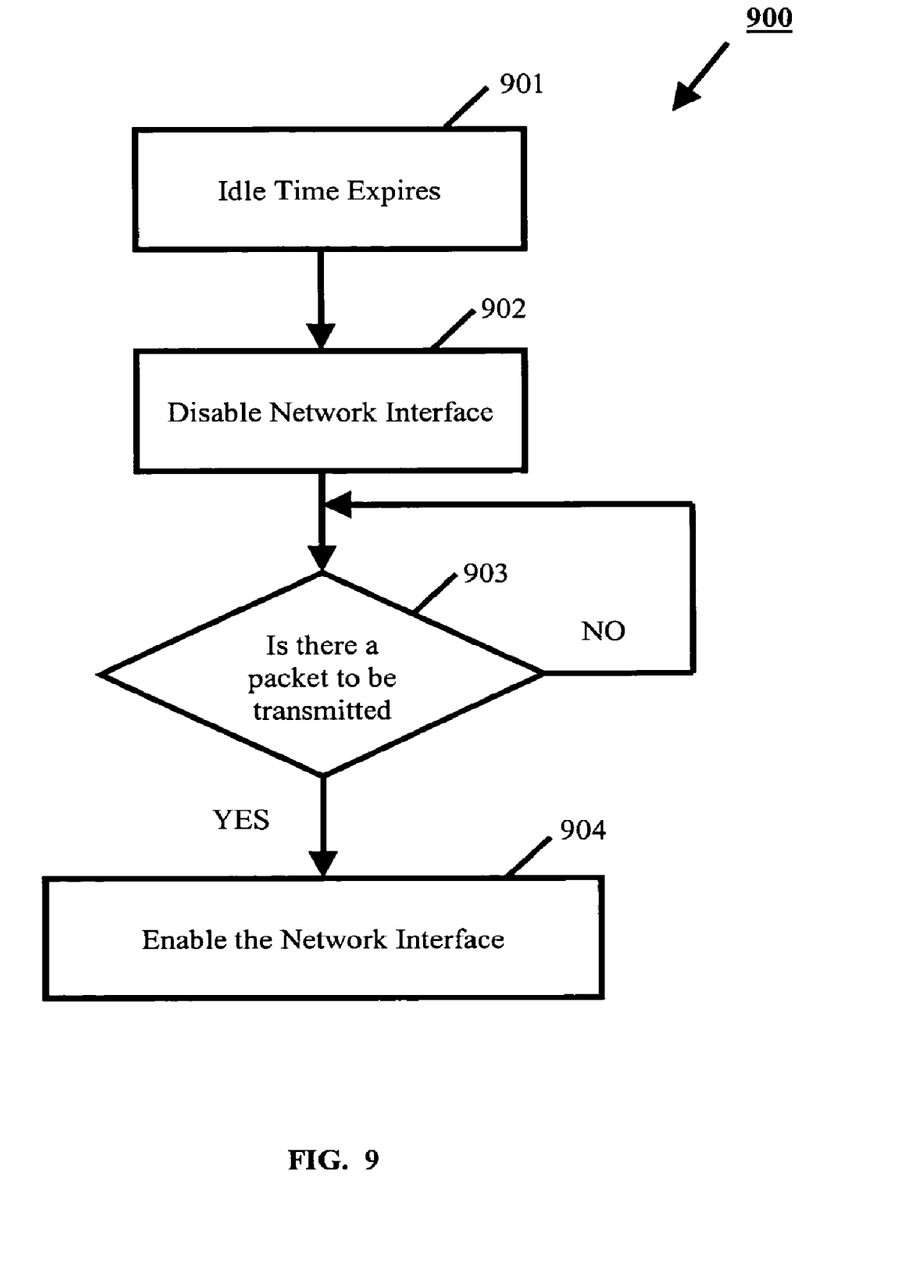
FIG. 9 is a flow diagram illustrating a process for the Idle-Time Processing Module (ITPM) of FIG. 1.

FIG. 1 is functional block diagram 10 of a HNIDS 100 in accordance with the embodiments of the invention. The HNIDS 100 comprises a Scan Module (SM) 101 and an Idle-Time Processing Module (ITPM) 102 operating on a host computer coupled to a network. The Scan Module (SM) may be a Scan Daemon. Details of SM and SD are described in greater detail with reference to FIG. 2 and FIG. 3. FIG. 9 shows the flow diagram for the ITPM. The modules 101 and 102 are independent with separate functionality.

The ITPM module is responsible for the idle-time feature. HNIDS can function without this. ITPM provides the intrusion prevention feature.

As the HNIDS 100 is local to a system, the HNIDS 100 does not directly interface with the outside world.

The HNIDS 100 can be a separate application that is installed on the host, or the HNIDS 100 can be part of the host's network implementation.

The ITPM 102 may comprise program code to enable and disable the network interface. When the idle-time expires, the ITPM 102 disables the network interface. The interface is enabled when a packet needs to be transmitted on to the network. Enabling and disabling of a network interface is well known in the art. The network interface (physical adapter) is not shown in the drawing. The ITPM 102 comprises code to enable/disable the network interface. Ways of accomplishing this task are well known to those skilled in the art.

This can be accomplished by providing interfaces (like IOCTL—Input/Output Control entry points) in the network driver software to enable/disable the network interface.

An Embodiment

Figure 2:
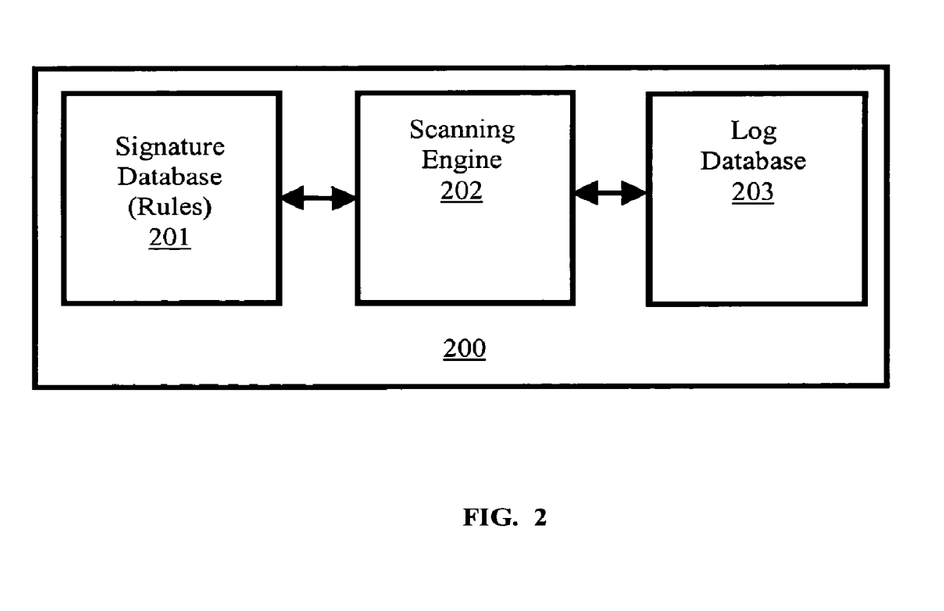
FIG. 2 is a functional block diagram of a Scan Module (SM) of FIG. 1.

FIG. 2 shows in greater detail the scan module (SM) 200. The scan module 200 comprises a scanning engine 202, a signature database 201 and a log database 203.

The signature database 201 contains a list of known attack signatures. This is analogous to the virus-signature database used by anti-virus systems. The scanning engine 202 uses the signatures in the signature database 201 to detect intrusions. The signature database 201 may be a plain ASCII file containing a list of signatures, although other file formats may be practiced. The signatures may be taken from the arachNIDS database.

Examples of signatures are given in Table 1, where '|' is used to enclose binary data in byte code format:

TABLE 1

| "|eb 02 eb 02 eb 02|" | This event indicates that an attacker attempted to overflow one of the daemons with jmp 0x02 "stealth nops". |
| "GetInfo|0d|" | This event indicates that an attacker is attempting to query the NetBus remote administration tool. This legitimate administration tool is often used by attackers as a Trojan. |
| "|5c|IPC$|00 41 3a 00|" | This event indicates that a remote user may be attempting to open a named pipe using the IPC$ share. |
| "|0b 00 00 00 07 00 00 00|Connect" | This event indicates that a remote user has attempted to connect to a dagger 1.4.0 Trojan server running on Windows. This connection attempt may indicate an existing compromise. |

The design of the signature database 201 is not limited per the embodiment described, but instead any suitable embodiment may be used. For example, instead of a plain ASCII file, the signatures may be stored in one or more of Microsoft Excel™ files and databases such as MySQL™ and PostgreSQL™.

The scanning engine 202 comprises program code to scan the data using the signature database 201 for the presence of a signature and take suitable action/s if any signature is found. In the embodiment of FIG. 2, relevant details may be logged to the log database 203. The action to be taken after the discovery of malicious data is not limited to the logging of errors. Other possible actions comprise modifying desktop firewall rules and informing the remote administrator. Other actions still may be practiced alone or in combination.

Figure 3:
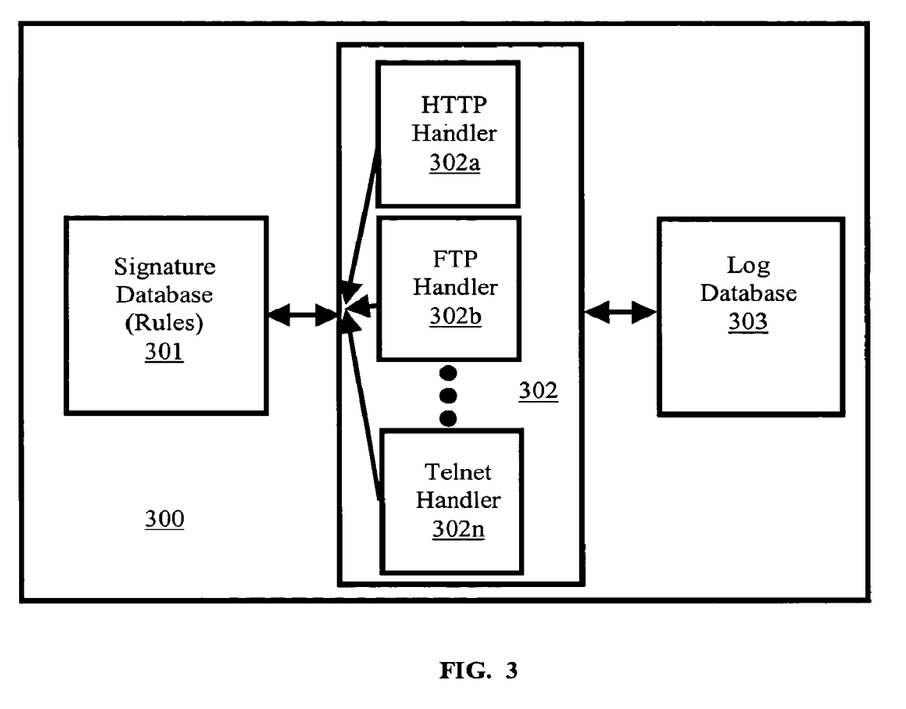
FIG. 3 is a functional block diagram of a Scan Daemon (SD) of FIG. 1.

FIG. 3 illustrates the scan daemon (SD) 300. The Application Receive Queue (ARQ) is the queue from where the application takes its data. The scan daemon 300 comprises program code 302 to monitor the ARQ for data and subsequently analyse the data. Typically, the code 302 comprises protocol handlers 302a . . . 302n corresponding to different application protocols. A handler 302a . . . 302n is activated only for the protocol ports that are configured to be monitored. For example, if HTTP 302a and FTP 302b are configured to be monitored, then only handlers 302a, 302b for these protocols are activated. These handlers 302a, 302b use the signature database 301 to scan the data. If a match is found, appropriate errors may be logged to the log database 303.

The embodiment of FIG. 3 is not the only possible embodiment for the scan daemon 300. Other actions taken may comprise modifying firewall rules to prevent reception of packets from the offending host and intimating the transport layer to tear down the existing connection, for example.

Figure 4:
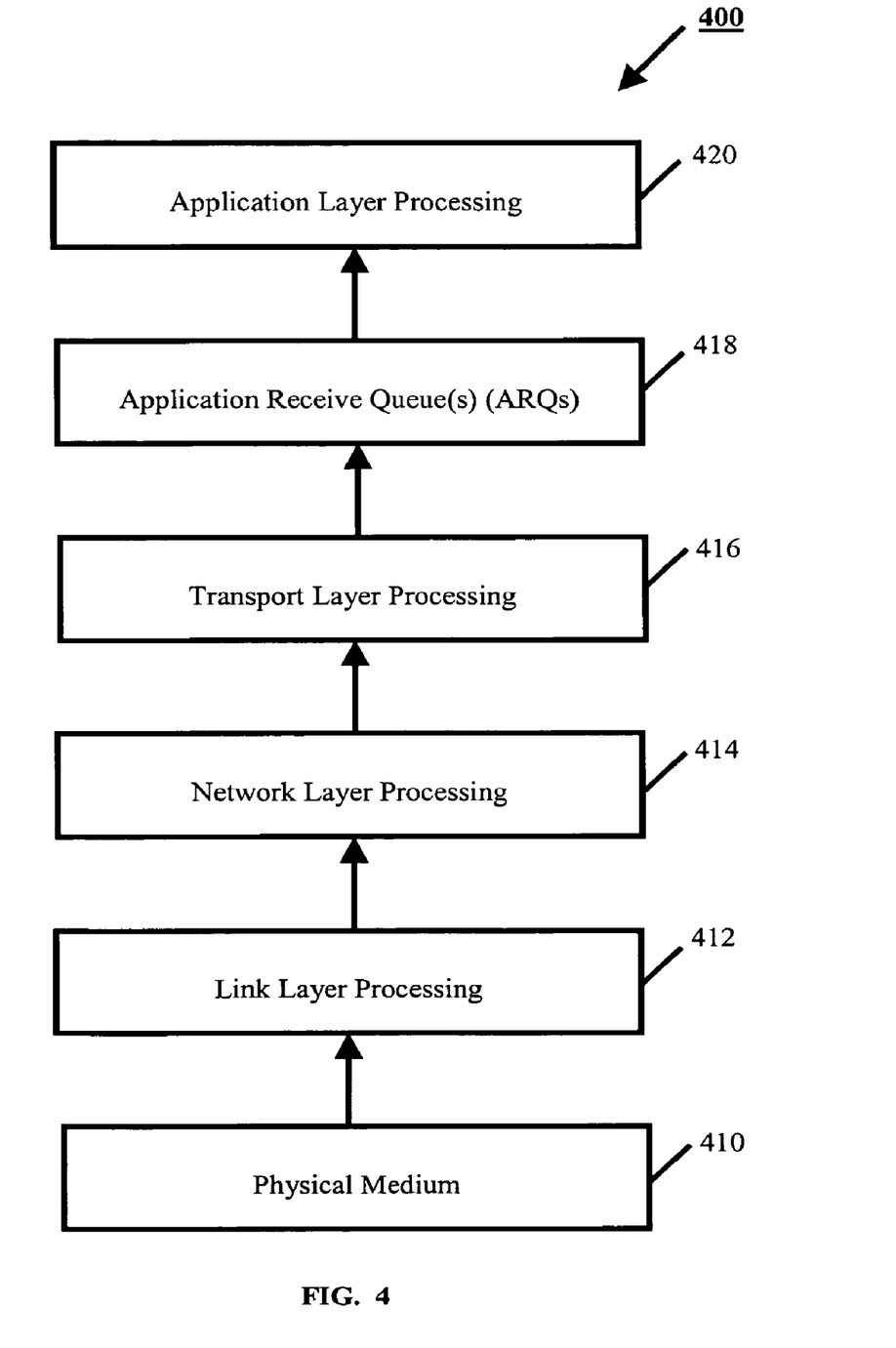
FIG. 4 is a diagram illustrating the normal flow of packets up a protocol stack and the processing that is done at each layer.

FIG. 4 shows the flow of packets up the protocol stack 400. The TCP/IP protocol stack is shown for illustration only. Other protocol stacks that may be practiced comprise any protocol stack that follows a layered model with a clear demarcation between the Transport and Application layers.

The physical medium 410 provides packets to the link layer 412, which in turn provides the packets to the network layer processing 414. From there, the packets go to the transport layer processing 416. The transport layer 416 copies the data to the Application Receive Queue 418, which is typically a socket queue. The application layer 420 then copies the data from the ARQ 418 and uses the data.

Figure 5:
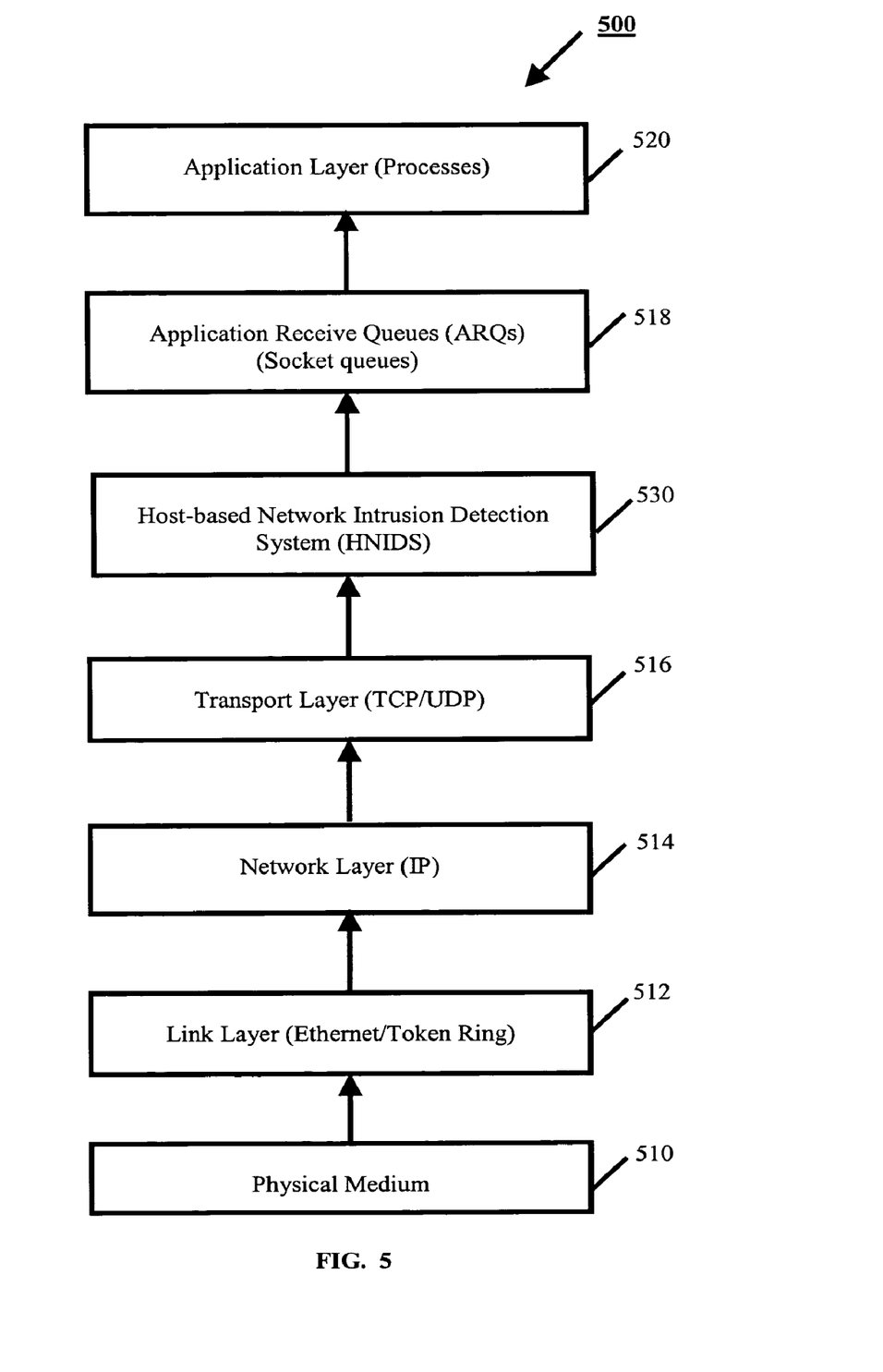
FIG. 5 is a diagram illustrating the normal flow of packets up a protocol stack in which a HNIDS is located between the Transport Layer and the Application Layer.

FIG. 5 shows an embodiment of the invention. The physical medium 510, the link layer 512, the network layer 514, and the transport layer 516 correspond to the respective features 410, 412, 414, and 416 of FIG. 4. The link layer 512 may be Ethernet, Token Ring, a wireless network, and other suitable networks, Ethernet and Token Ring are named just for illustration. The link layer may be any of a number of networks, provided that the transport layer and the application layer of the network implementation are clearly demarcated, which is usually the case. The network layer 514 may be IP. The transport layer 516 may be TCP/UDP. The Host-Based Network Intrusion Detection System (HNIDS) 530 functions between the transport layer 516 and the application layer 520. The HNIDS 530 uses the scan module (SM) 200 of FIG. 2 in this embodiment. The HNIDS 530 preferably interfaces between the transport layer 516 and the ARQ 518.

Figure 6:
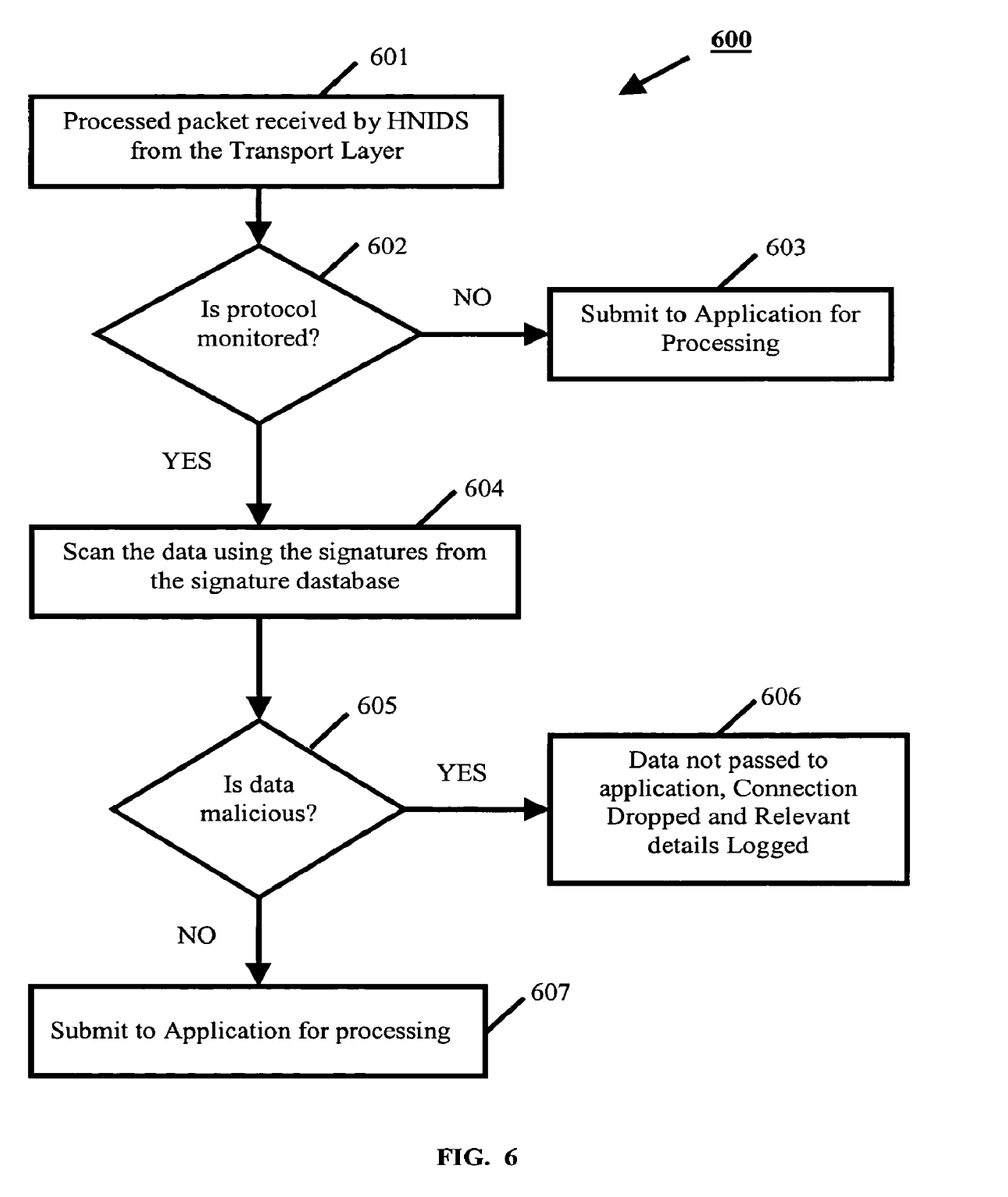
FIG. 6 is a flow diagram illustrating a process for the embodiment shown in FIG. 5.

FIG. 6 is a flow diagram summarizing the process 600 for the embodiment of FIG. 5. A packet is received by the HNIDS 530 from the transport layer 516 in step 601. The HNIDS 530 verifies if the network protocol is monitored in step 602. If the protocol is not monitored (NO), HNIDS 530 passes the data to the corresponding application 520 in step 603. If the protocol is monitored (YES), then the scanning engine 202 scans the data using the signature database 201 in step 604. In decision step 605, a check is made to determine if the data is malicious. If the data is malicious (YES), the data is not passed to the application 520 (the data is not put into the ARQ), the associated connection is dropped and errors are logged in step 606. Dropping the connection means that the network connection with the remote host is torn down. The system can continue servicing requests on other existing/new connections. However, in step 606, these are not the only possible actions that can be taken, when the data is found to be malicious. Other possible actions comprise blocking access to the attacking host, blocking network access from the attacking host, and notifying the system administrator. Still other actions may be practiced. If the data is not malicious (NO), the data is passed to the corresponding application 520 in step 607.

Another Embodiment

Figure 7:
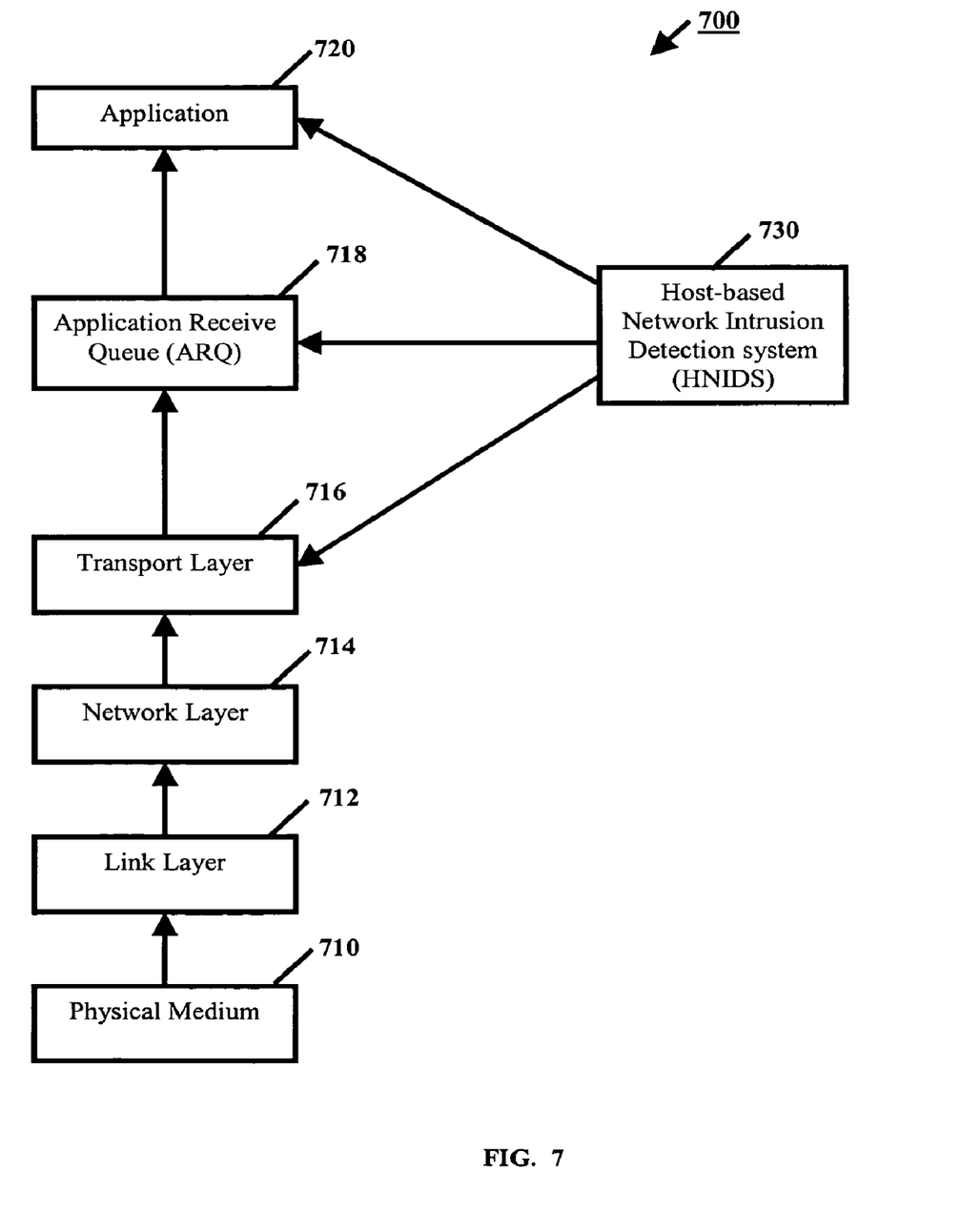
FIG. 7 is a diagram similar to that of FIG. 5 in which a HNIDS monitors the Application Receive Queue (ARQ)

FIG. 7 shows another embodiment. The physical medium 710 and the layers 712, 714, 716 of FIG. 7 correspond to the respective medium 410 and layers 412, 414, 416 of FIG. 4. Data is passed from the transport layer 716 to the Application Receive Queue (ARQ) 718, before being passed on to the application layer 720. The HNIDS 730 of the further embodiment monitors the Application Receive Queue (ARQ) 718, as indicated by the arrow between the HNIDS 730 and the ARQ 718. The arrow from the HNIDS 730 to the transport layer 716 indicates the HNIDS 730 may inform/instruct the transport layer 716 to tear down a connection with a remote host, if desired (or to initiate any other appropriate action). The arrow from the HNIDS 730 to the application layer 720 indicates the HNIDS 730 may inform/instruct the application 720 so as not to process the packet, to reset/free resources associated with the particular malicious connection, or even to kill the application 720, if necessary. The HNIDS 730 uses the scan daemon 300 of FIG. 3 in this embodiment.

Figure 8:
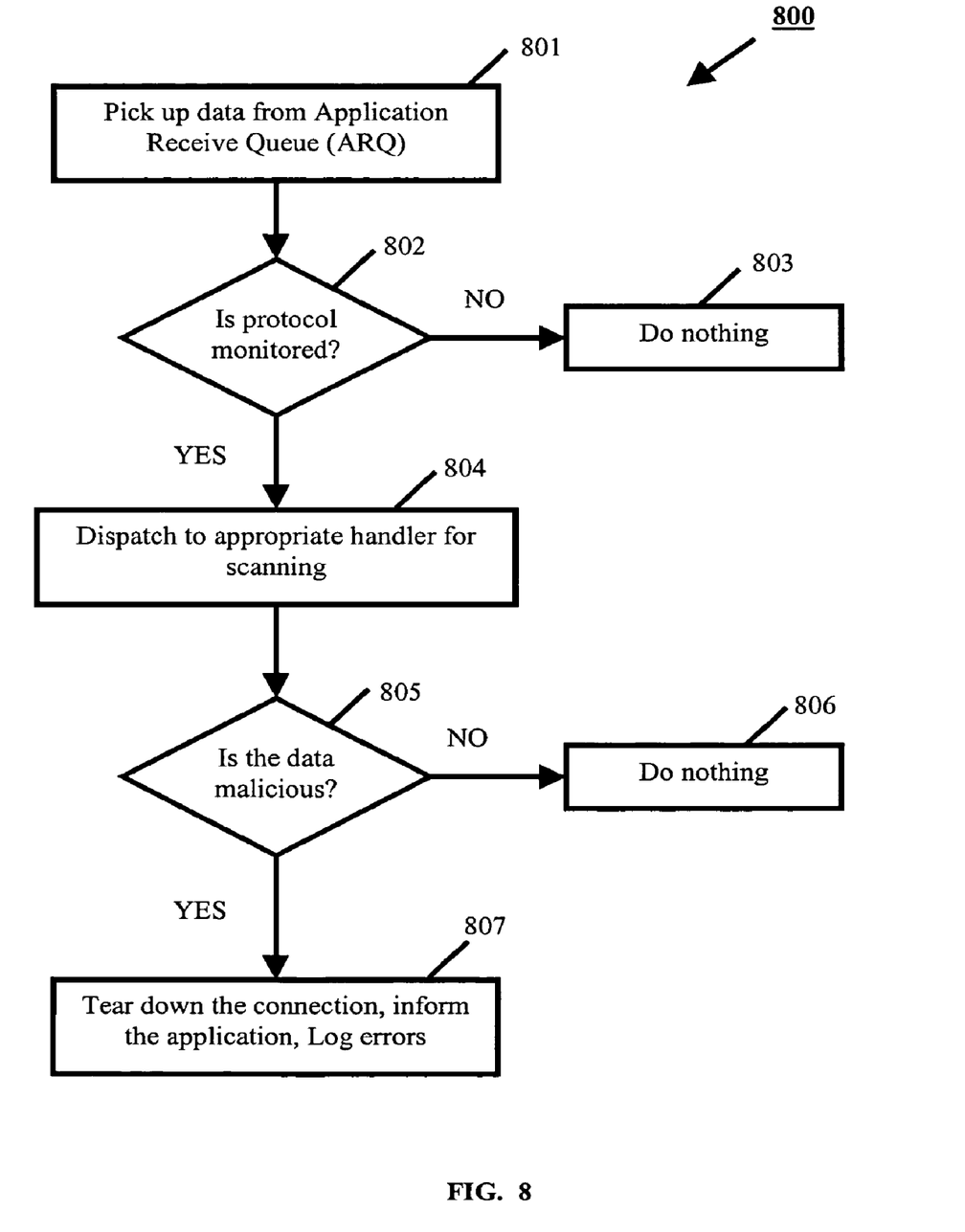
FIG. 8 is a flow diagram illustrating a process for the embodiment shown in FIG. 7.

FIG. 8 is a flow diagram summarizing the process 800 as per the above embodiment. The HNIDS 730 picks up data from the ARQ 718 and analyses the data in step 801, as and when the data arrives. In decision step 802, the HNIDS 730 determines if the protocol is monitored. If the protocol is not monitored (NO), the HNIDS 730 does nothing in step 803. If the protocol is monitored (YES), the scanning daemon 300 dispatches the appropriate protocol handler 302a . . . 302n to scan the data using the signature database 301 in step 804. In decision step 805, a check is made to determine if the data is malicious. If the data is not malicious (NO), the handler does nothing in step 806. That is, no action is required in step 806. If the data is malicious (YES), the protocol handler takes suitable action in step 807, such as tearing down the appropriate connection, killing the application, notifying the application, blocking network access from the attacking host and logging the relevant details. Any one or more of these actions may be implemented. Other actions may be implemented.

Idle-Time Processing Module

FIG. 9 is a flow diagram summarizing the process 900 for the idle-time processing module 102 of FIG. 1. When the idle time expires in step 901, the network interface is disabled in step 902. In decision step 903, a check is made to determine if there is a packet to be transmitted. If there is an indication for a packet to be transmitted (YES), the network interface is enabled again in step 904. Enabling and disabling of network interfaces is well known in the art. Otherwise, if there is no packet to be transmitted in step 903 (NO), processing returns to step 903.

The ITPM and the SCAN module are separate modules. The ITPM is responsible for the idle-time feature. HNIDS can function without this. ITPM provides an intrusion prevention feature.

The ITPM module is a separate component of the HNIDS that is responsible for providing an intrusion prevention feature in the HNIDS. The ITPM offlines the host if there are no packets transmitted from the system for a considerable period of time.

Further Embodiment

Figure 10:
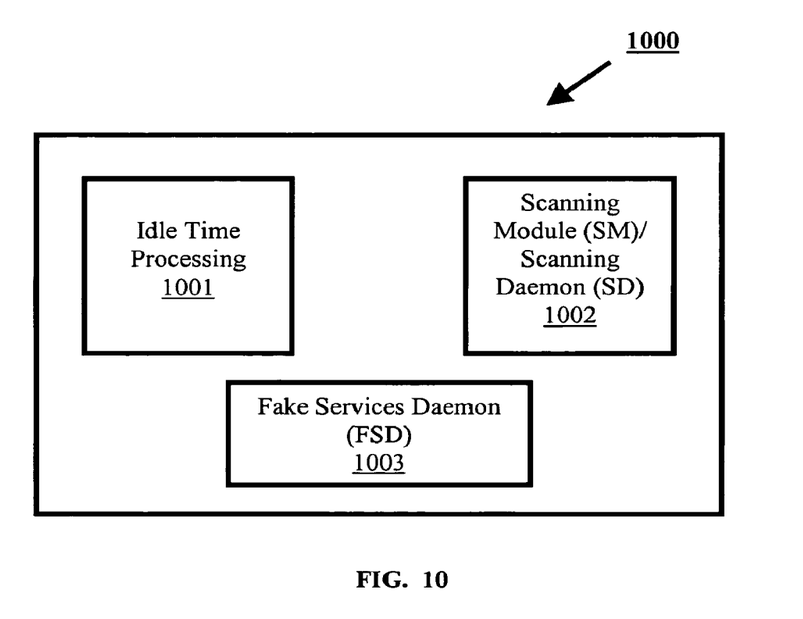
FIG. 10 is a functional block diagram of a HNIDS with provisions for fake services.

FIG. 10 is a functional block diagram of the HNIDS 1000 with the ability to fake services. The HNIDS 1000 comprises an Idle-Time Processing Module 1001, a Scan Module (SM) or Scan Daemon (SD) 1002, and a Fake Services Daemon (FSD) 1003. The modules 1001,1002 and 1003 are independent modules with their own specific functionality. The modules 1001 and 1002 are the same as explained in relation to FIG. 1.

The FSD 1003 contains program code to fake services. The services that need to be faked are configurable. Depending upon the fake services that are configured, the FSD 1003 spawns appropriate handlers. These handlers are actually fake daemons that listen on the appropriate ports for connection requests. These daemons are not full-fledged applications, but are used for generating fake responses to fool the attacker and log the relevant details. As an example, an HTTP server may be configured as a fake service. The FSD 1003 spawns a fake HTTP daemon, which listens for connection requests on the HTTP port (80). As and when a connection request arrives on this port, relevant details such as the source IP address, hardware address, and the like are logged, and a (fake) response sent to the requesting host.

Although a small number of embodiments of the invention have been described in detail, other embodiments are possible.

Computer Implementation

The embodiments of the invention may be implemented using a computer. In particular, the processing or functionality described above and depicted in FIGS. 1-10 can be implemented as software, or a computer program, executing on the computer. The method or process steps disclosed for detecting an intrusion in a communications network are effected by instructions in the software that are carried out by the computer. Likewise, the method or process steps disclosed for preventing an intrusion in a communications network may be effected by instructions in the software that are carried out by the computer. The software may be implemented as one or more modules for implementing the process steps. A module is a part of a computer program that usually performs a particular function or related functions. Also, a module can be a packaged functional hardware unit for use with other components or modules.

In particular, the software may be stored in a computer readable medium, including the storage devices described hereinafter. The software is preferably loaded into the computer from the computer readable medium and then carried out by the computer. A computer program product includes a computer readable medium having such software or a computer program recorded on the medium that can be carried out by a computer. The use of the computer program product in the computer preferably effects an advantageous system for detecting an intrusion in a communications network in accordance with the embodiments of the invention. Likewise, a system for preventing an intrusion in a communications network may be implemented.

The computer system can be connected to one or more other computers via a communication interface using an appropriate communication channel such as a modem communications path, a computer network, or the like. The computer network may include a local area network (LAN), a wide area network (WAN), an Intranet, and/or the Internet. The computer may include a central processing unit(s) (simply referred to as a processor hereinafter), a memory which may include random access memory (RAM) and read-only memory (ROM), input/output (IO) interfaces, a video interface, and one or more storage devices. The storage device(s) may include one or more of the following: a floppy disc, a hard disc drive, a magneto-optical disc drive, CD-ROM, DVD, magnetic tape or any other of a number of non-volatile storage devices well known to those skilled in the art. The program for detecting an an intrusion in a communications network may be recorded on such a storage unit and read by the computer into memory; the same applies to a program for preventing such an intrusion. Each of the components of the computer is typically connected to one or more of the other devices via a bus that in turn can comprise data, address, and control buses. While a system using a processor has been described, it will be appreciated by those skilled in the art that other processing units capable of processing data and carrying out operations may be used instead without departing from the scope and spirit of the invention. The idle-time processing module 102 and the scan module 101 of the HNIDS 100 may be implemented using such a computer.

The described computer system is simply provided for illustrative purposes and other configurations can be employed without departing from the scope and spirit of the invention. Computers with which the embodiment can be practiced include IBM-PC/ATs or compatibles, one of the Macintosh™ family of PCs, Sun Sparcstation™, a workstation or the like. The foregoing are merely examples of the types of computers with which the embodiments of the invention may be practiced. Typically, the processes of the embodiments, described hereinafter, are resident as software or a program recorded on a hard disk drive as the computer readable medium, and read and controlled using the processor. Intermediate storage of the program and intermediate data and any data fetched from the network may be accomplished using the semiconductor memory, possibly in concert with the hard disk drive.

In some instances, the computer program may be supplied to the user encoded on a CD-ROM or a floppy disk, or alternatively could be read by the user from the network via a modem device connected to the computer, for example. Still further, the software can also be loaded into the computer system from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely an example of relevant computer readable mediums. Other computer readable mediums may be practiced without departing from the scope and spirit of the invention.

In the foregoing manner, methods, systems, and computer program products have been disclosed for detecting an intrusion in a communications network. Also, methods, systems, and computer program products have been disclosed for preventing an intrusion in a communications network. The detailed description provides preferred exemplary embodiments only and is not intended to limit the scope, applicability, and/or configuration of the invention. Rather, the detailed description of the preferred exemplary embodiments provides those skilled in the art with enabling descriptions for implementing the preferred exemplary embodiments of the invention. It should be understood that various changes and/or substitutions may be made in the function and arrangement of elements without departing from the scope and spirit of the invention as set forth in the appended claims.

We claim:

1. A method of preventing an intrusion in a communications network, the method comprising the steps of:
    switching a network interface of a host computer from an enabled state to a disabled state responsive to expiration of an idle time, wherein the host cannot receive packets with the network interface disabled, so that with the network interface disabled network communication intrusions to the host are prevented;
    determining if the host has, while the host is in the disabled state, generated any packets to be transmitted over the communications network; and
    switching said network interface from the disabled state to the enabled state responsive to the determining at least one packet is available to be transmitted.

2. The method of claim 1, wherein the idle time comprises a predetermined time interval during which no packet is transmitted from the system.

3. The method of claim 1, wherein disabling the network interface comprises:
    disabling the network interface via an input/output control entry point of a network driver.

4. The method of claim 1, wherein the method further comprises:
    scanning data packets processed by a transport layer of a network protocol associated with said communications network using signatures from a repository of said signatures, wherein the scanning is during a time when said network interface is enabled;
    determining if said scanned data packets are malicious; and
    taking at least one action if any data packets are determined to be malicious.

5. The method of claim 4, wherein the at least one action comprises:
    interrupting transmission of the data packets before transmitting the interrupted data packets to an application layer of the host.

6. The method of claim 1, wherein the method further comprises:
    monitoring a port of the host by a daemon to detect requests on the port during a time when said network interface is enabled;
    sending a fake response to a requesting host responsive to detecting a request on the port from the requesting host; and
    logging predetermined properties of the detected request.

7. A system of preventing an intrusion in a communications network, the system comprising:
    a storage unit for storing data and instructions for a processing unit; and
    a processing unit coupled to said storage unit, said processing unit being programmed to switch a network interface of a host from an enabled state to a disabled state responsive to expiration of an idle time, wherein the host cannot receive packets with the network interface disabled, so that with the network interface disabled network communication intrusions to the host are prevented,
    to determine if the host has, while the host is in the disabled state, generated any packets to be transmitted over the communications network;
    and to switch said network interface from the disabled state to the enabled state responsive to the determining at least one packet is available to be transmitted.

8. The system of claim 7, wherein said idle time comprises a predetermined time interval during which no packet is transmitted from the system.

9. The system of claim 7, comprising:
    a network driver for the network interface, wherein said network interface is disabled via an input/output control entry point of the network driver.

10. The system of claim 7, wherein said processing unit is programmed to:

scan data packets processed by a transport layer of a network protocol associated with said communications network using signatures from a repository of said signatures, wherein the scanning is during a time when said network interface is enabled;

determine if said scanned data packets are malicious; and take at least one action if any data packets are determined to be malicious.

11. The system of claim 10, wherein the at least one action comprises transmission interruption of the data packets before transmitting the interrupted data packets to an application layer of the host.

12. The system of claim 7, wherein said processing unit is programmed to:

monitor a port of the host by a daemon to detect requests on the port during a time when said network interface is enabled;

send a fake response to a requesting host responsive to detecting a request on the port from the requesting host; and log predetermined properties of the detected request.

13. A non-transitory computer-readable storage medium, with an executable program for of preventing an intrusion in a communications network stored thereon, wherein the program instructs a computer system to perform the following steps:

switching a network interface of a host from an enabled state to a disabled state responsive to expiration of an idle time, wherein the host cannot receive packets with the network interface disabled, so that with the network interface disabled network communication intrusions to the host are prevented;

determining if the host has generated any packets to be transmitted over the communications network while the host is in the disabled state; and switching said network interface from the disabled state to the enabled state responsive to the determining if at least one packet is available to be transmitted.

14. The computer-readable medium of claim 13, wherein the idle time comprises a predetermined time interval during which no packet is transmitted from the system.

15. The computer-readable medium of claim 13, wherein disabling the network interface comprises disabling the network interface via an input/output control entry point of a network driver.

16. The computer-readable medium of claim 13, wherein during a time when said network interface is enabled, the programmed instructions further comprise:

programmed instructions for scanning data packets processed by a transport layer of a network protocol associated with said communications network using signatures from a repository of said signatures;

programmed instructions for determining if said scanned data packets are malicious; and programmed instructions for taking at least one action if any data packets are determined to be malicious.

17. The computer-readable medium of claim 16, wherein the at least one action comprises interrupting transmission of the data packets before transmitting the interrupted data packets to an application layer of the host.

18. The computer-readable medium of claim 13, wherein the programmed instructions further comprise:

programmed instructions for monitoring a port of the host by a daemon to detect requests on the port during a time when said network interface is enabled, programmed instructions for sending a fake response to a requesting host responsive to detecting a request on the port from the requesting host; and programmed instructions for logging predetermined properties of the detected request.

* * * * *